W. Matthews,
Ratchet Drill,

Nº 65,410. Patented June 4, 1867.

Witnesses.
John H. Shumway
A. J. Libbits

Inventor.
Wm Matthew
By his atty John E. Earle

United States Patent Office.

WILLIAM MATTHEWS, OF BRIDGEPORT, CONNECTICUT, ASSIGNOR TO HIMSELF AND L. W. EATON, OF SAME PLACE.

Letters Patent No. 65,410, dated June 4, 1867.

IMPROVED RATCHET-DRILL.

The Schedule referred to in these Letters Patent and making part of the same.

TO ALL WHOM IT MAY CONCERN:

Be it known that I, WILLIAM MATTHEWS, of Bridgeport, in the county of Fairfield, and State of Connecticut, have invented a new improvement in Ratchet-Drill; and I do hereby declare the following, when taken in connection with the accompanying drawings, and the letters of reference marked thereon, to be a full, clear, and exact description of the same, and which said drawings constitute part of this specification, and represent, in—

Figure 1:
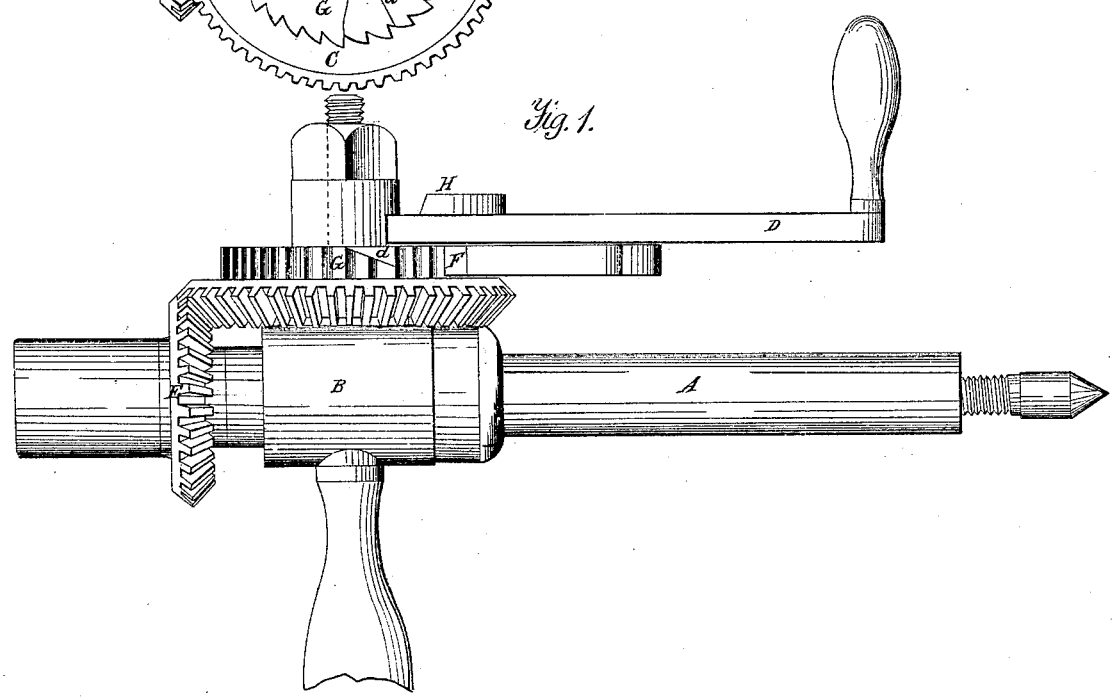

Figure 1, a side view, and in

Figure 2:
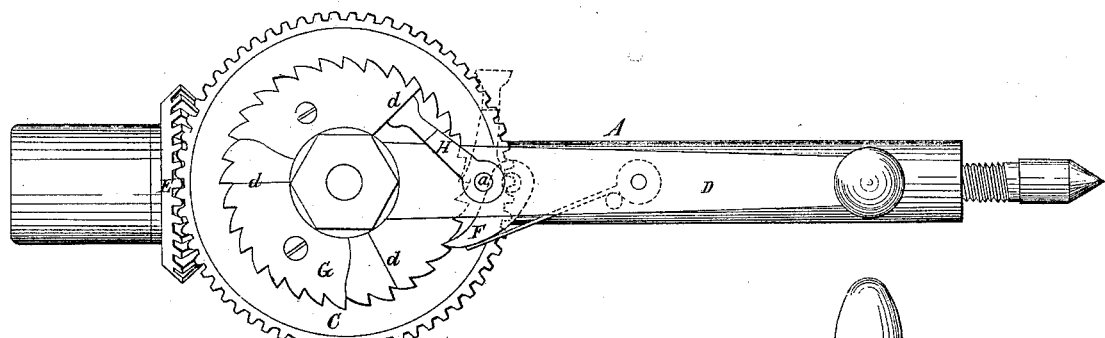

Figure 2 a like view turned one-quarter over.

This invention relates to an improvement in the ordinary ratchet or hand-drill, and consists in the arrangement whereby it may be used either as a ratchet or hand-drill at the pleasure of the operator.

To enable others to construct and use my improvement, I will proceed to describe the same as illustrated in the accompanying drawings.

A is the mandrel, of the ordinary construction for a ratchet or hand-drill, constructed so as to be revolved in a socket, B. C is a bevel-wheel attached to the socket B, and so as to be revolved by turning the crank D and working in a corresponding pinion, E, in the mandrel. Such turning causes the mandrel to revolve. The crank D operates to turn the gear C by means of a pawl, F, on the crank working in a ratchet-wheel, G, as seen in fig. 2. As a ratchet-drill, the crank is turned partially around to revolve the mandrel, then returned; the pawl falls back into another notch on the ratchet-wheel, so that when the crank is again advanced another partial revolution is given to the mandrel in the usual manner for ratchet-drills. For a hand-drill I arrange a dog, H, pivoted to the crank at $a$, as seen in fig. 2, and form one or more notches $d$ upon the face of the ratchet-wheel G, so that when the dog H is turned into a notch, $d$, as in fig. 2, the crank is firmly held by the combination of the dog H and pawl F, so that it may be turned in either direction and revolve the mandrel accordingly, or when to be used only as a ratchet-drill turn the dog H from the position denoted in black to that denoted in red, fig. 2, when it may be used as a ratchet-drill. Therefore by the application of the dog H, as the only additional part, the drill is convertible at pleasure into either a ratchet or hand-drill. I attach a handle, L, to the socket for the convenience of the operator.

Having thus fully described my invention, what I claim as new and useful, and desire to secure by Letters Patent, is—

The combination of the pawl F and dog H with the ratchet-wheel G, when constructed and arranged to operate as herein described and shown.

WILLIAM MATTHEWS.

Witnesses:
SAMUEL LARKIN,
C. B. CURTISS.